United States Patent [19]

Sarkissian

[11] Patent Number: 5,045,665
[45] Date of Patent: Sep. 3, 1991

[54] FLUID COOLED TORCH

[75] Inventor: Vicken R. Sarkissian, Woodland Hills, Calif.

[73] Assignee: Delaware Capital Formation, Burbank, Calif.

[21] Appl. No.: 510,355

[22] Filed: Apr. 16, 1990

[51] Int. Cl.$^5$ .............................................. B23K 9/00
[52] U.S. Cl. ...................................... 219/75; 219/136
[58] Field of Search ........................ 219/60.2, 136, 75

[56] References Cited

U.S. PATENT DOCUMENTS

| | | | |
|---|---|---|---|
| 3,350,537 | 10/1967 | Lawrence et al. | 219/60.2 |
| 3,461,269 | 8/1969 | Stevens et al. | 219/60.2 |
| 3,493,716 | 2/1970 | Martin | 219/60.2 |
| 3,629,539 | 12/1971 | Roberts | 219/60.2 |
| 4,571,475 | 2/1986 | Rabe | 219/60.2 |

Primary Examiner—Clifford C. Shaw
Attorney, Agent, or Firm—Jessup, Beecher & Slehofer

[57] ABSTRACT

A torch system adapted primarily for a welding torch comprises an elongated handle within which is a manifold. Passages in the manifold permit separate tubes or conduits that carry cooling water and shielding gas to be incorporated into a single series of concentric tubes projecting from the handle which create annular passages radially spaced from each other. These passages carry the cooling water and the heated return water after it has cooled the torch head at the distal end of the apparatus. The distal end of the apparatus has a torch head, the inward facing face of which is in contact with the cooling water as it flows from the inner annular passage radially outward to the outer annular passage. The water returns through the handle and to the individual return conduit, then back to a suitable receptacle, which may be in the form of a heat exchanger or refrigerator that removes the heat injected into the cooling fluid by the torch head.

4 Claims, 2 Drawing Sheets

FLUID COOLED TORCH

This invention relates to a torch system, and particularly to a welding torch system in which a shielding gas such as argon is conveyed to the welding electrode, and in addition, cooling fluid such as water is circulated adjacent to the welding head to remove excess heat generated by the torch operation.

SUMMARY OF THE INVENTION

A torch head is cooled by being provided with circulating cooling fluid such as a mixture of water and ethylene glycol. The cooling water is conveyed to the head by concentric tubular passages, the water flowing to the head through an inner, annular concentric passage, thence into heat transfer contact with a face of the head, and thence returning through an outer, concentric annular passage.

A manifold is provided for linking the cooling water supply and return with the concentric tubes which ultimately interface with the welding head.

THE DRAWINGS

In the drawings, FIG. 1 is a perspective view of the welding system of this invention.

DESCRIPTION OF THE PREFERRED EMBODIMENT

Figure 1:
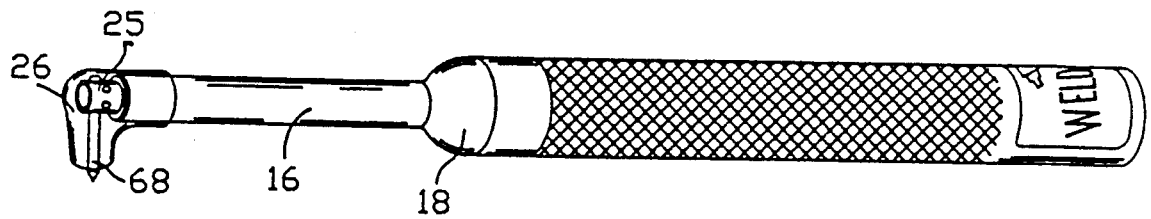
Figure 2:
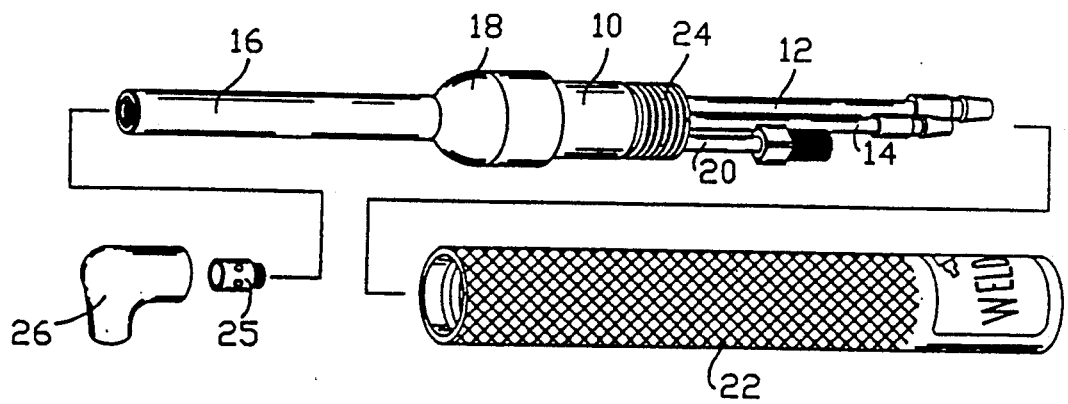
FIG. 2 is an exploded view of the assembly shown in FIG. 1.

In FIGS. 1 and 2, 10 is a manifold which interfaces an input water tube 12 and an output water tube 14 with concentric annular passages within a tube which is contained within an outer insulating housing 16. On the inner end of housing 16 is formed an enlargement 18 into which is secured the manifold 10. A third tube 20 passes through the manifold 10, carrying shielding gas, such as argon, for the electrode of the torch. An insulating tubular handle 22 is threaded at 24 over the manifold 10 and the tubes 12, 14, and 20. Into the distal the housing 16 is fitted the torch head assembly 25 over which is fitted a transparent nozzle 26.

Figure 4:
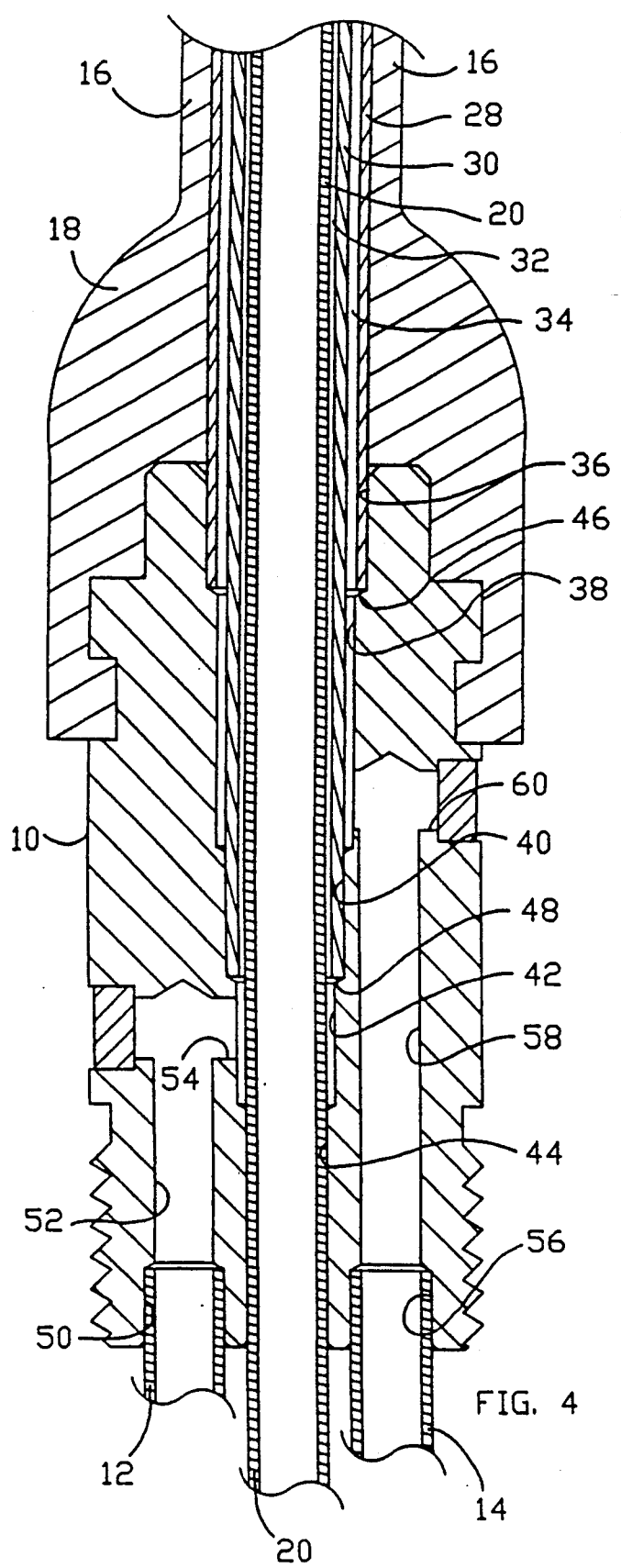
FIG. 4 is a longitudinal section of the manifold portion of the system in which individual tubes carrying cooling water are interfaced in the structure and are further conveyed by concentric annular passages to the welding head.

FIG. 4 shows in enlarged longitudinal section the manifold 10 and the adjoining housing 16 with its enlarged portion 18. Contained within the housing 16 are a series of concentric metal tubes comprising an outer tube 28, an inner tube 30, and a center tube 20. The center tube 20 carries the shielding argon directly through the manifold 10. The other tubes, 28 and 30, form therebetween annular fluid passages for circulating the cooling fluid, water and ethylene glycol, to and from the torch head. The annular passage 32 between the inner tube 30 and the center tube 20 constitutes a first conduit for conveying cooling water to the welding head assembly 25. From the head 24 the water returns through the annular passage 34, between the outer tube 28 and the inner tube 30, constituting a second conduit for the conveyance of cooling water.

Figure 5:
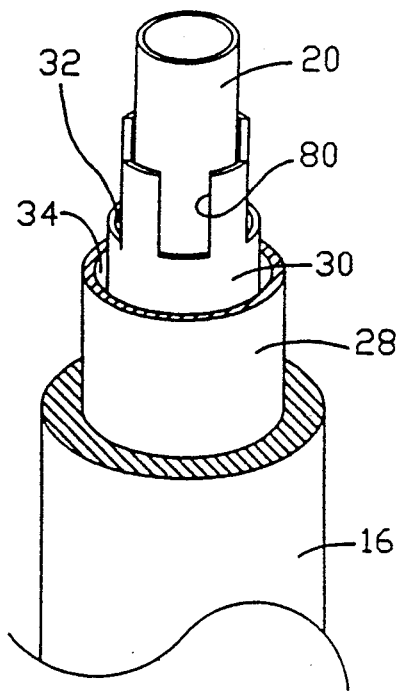
FIG. 5 is a partial perspective and broken away cross section showing the structure of the concentric tubes as they interface with the torch head.

An axial bore through the manifold 10 accommodates the coaxial tubes 28, 30 and 20. This bore is cylindrical and of stepped decreasing diameter, and consists of a first bore portion 36 of relatively large diameter. Inwardly of the manifold 10 is a second bore portion 38 of smaller diameter, followed further inwardly of the manifold 10 by a third bore portion 40 of still smaller diameter and culminating in an even smaller fourth bore portion 42. Finally, a fifth bore portion 44 of the smallest diameter, accommodates tightly the center tube 20 which carries the shielding argon to the torch. The concentric nature of the various tubes is shown in FIG. 5.

Fitted tightly into the first bore portion 36 is the outer tube 28 which terminates at a shoulder 46, where the diameter of the bore 36 steps down to the diameter of the bore 38. Fitted tightly within the bore 40 is the inner tube 30, which terminates at the shoulder 48, where the bore 40 steps down to the bore 42.

The structure described provides a pair of concentric annular passages, 32 and 34, designed to carry the inbound and outbound cooling water. Communication between these respective passages and the tubes 12 and 14 is provided by a pair of radial bores or passages as follows: Tube 12, carrying the incoming cooling water, is fitted into a longitudinal bore 50, radially spaced from the axial tube 20. Tube 12 communicates with an aligned longitudinal bore 52 (spaced radially from the center bore 44 which has the center tube, 20.) At the inner end of the bore 52 is a radial passage 54 which provides communication between the bore 52 and the bore portion 42 forming the annular inner passage 32.

A second longitudinal bore 56 accommodates tightly the tube 14 and communicates with an aligned longitudinal bore 58, also spaced radially from the center bore 44. At the end of the bore 58 is a radial passage 60 which communicates with the bore portion 38 and hence with the outer annular cooling passage 34.

Cooling water flows into the system through the tube 12, bores 52 and 54, and into inner annular passage 32. It then flows to the torch head assembly 62, contacting the head 62 in heat transferring relationship, then returning through the outer annular passage 34, thence into the bore portion 38, radial bore 60, longitudinal bore 58, into the outlet tube 14.

The tubes 12 and 14 are interconnected externally of the torch system through a suitable heat exchanger or cooler (not shown), so that the cooling fluid re-circulates through the system.

Figure 3:
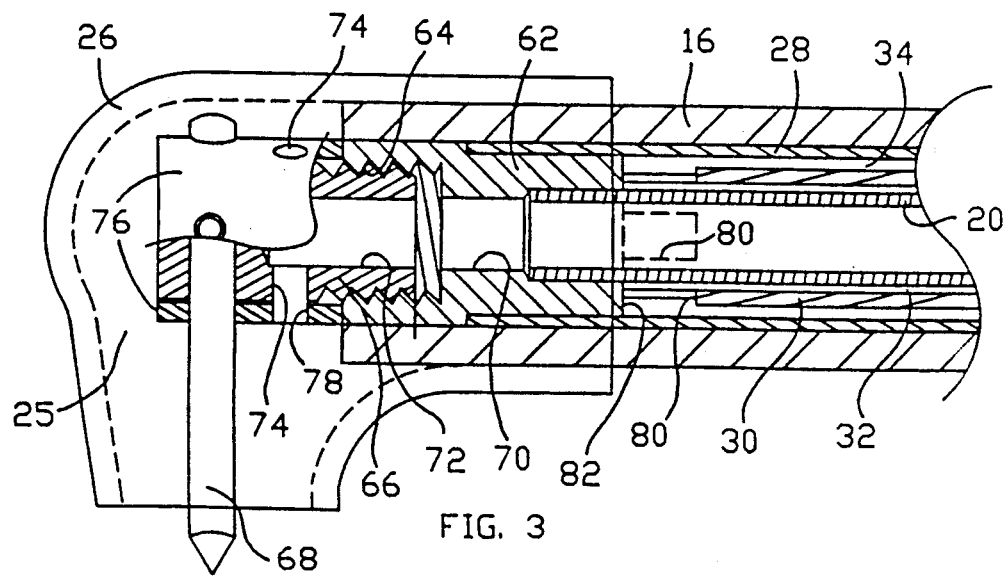
FIG. 3 is a longitudinal section of the head portion of the torch system.
Figure 6:
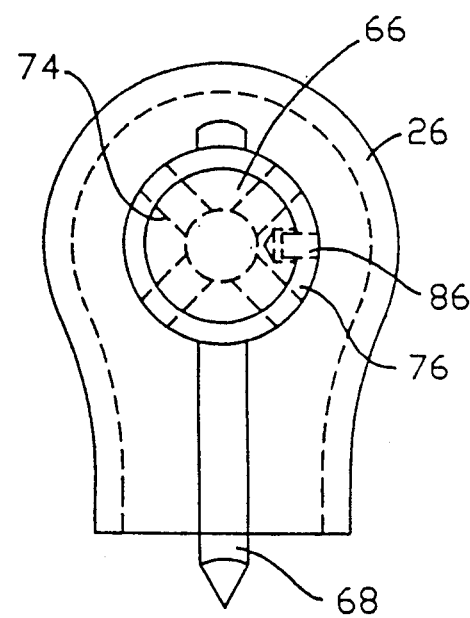
FIG. 6 is an end view along line 6—6 in FIG. 3.

The torch end of the system is shown in FIGS. 3, 5 and 6. A torch head 62 is fitted into the distal end of the outer tube 28 as shown in FIG. 3. It has a tapped, axial, bore at 64, into which is threaded a torch chuck 66 that receives a transverse welding electrode 68. The head 62 has an axial bore 70 aligned with the tube 20 and this passage is continued in the form of a bore 72 in the chuck 66, which extends about midway through the chuck and terminates in a series of radial ports 74 that allow the argon to flow into the nozzle 26 surrounding the electrode 68. Mounted over the projecting end of the chuck 66 is a sleeve 76 which has ports 78 aligned with the ports 74 to allow escape of the argon into the chamber surrounding the electrode 68.

The distal end of the tube 30 is castellated with notches 80 which allow the cooling water to flow from the inner annular passage 32 radially outward into the annular outer passage 34, and thence return to the tube 14 and out of the system. In doing so, the cooling water comes into heat transfer contact with the end face 82 of the head 62. Heat flows from the assembly, including the chuck 66 and head 62, into the cooling water and is thence carried by the water flow out of the system.

In addition to conveying shielding gas to the torch, the tube 20, being conducting, also carries torch current through the tube 20, head 62, chuck 66, to the electrode 68.

The electrode 68 is clamped in the torch head by the shearing action between sleeve 76 and chuck 66 that occurs when the chuck 66 is threaded at 64 into the head 62. While the screwing in allows the chuck 66 to move axially inward, the sleeve 76 abutting the end face of the head 62 is stopped from inward movement, and the clamping action on the electrode 68 occurs at the interface between the chuck 66 and the sleeve 76. Clamping is achieved by using the electrode 68 as a wrench handle to turn the chuck slightly, thereby loosening and tightening the electrode. The sleeve 76 is secured to the chuck 66 by a pin 86 shown in FIG. 6.

What is claimed is:

1. Torch system having concentric tubes, comprising:
   a torch head having an axial bore and a face at one end substantially normal to said axial bore;
   a center tube coaxial with said axial bore and communicating therewith;
   said head having a chuck recess adapted to hold an electrode;
   a passageway communicating with said axial bore and adapted to flow shielding gas to the electrode;
   an inner tube coaxially circumjacent said center tube and having one end abutting said face, an interior region of said inner tube comprising a first axial passage in heat transfer relation with said face;
   an outer tube concentric with and circumjacent said inner tube, the annular region between the walls of said inner and outer tubes comprising a second axial passage;
   said one end of said inner tube having passage means through the wall of said inner tube to provide fluid passage between said first axial passage and said second axial passage;
   whereby fluid may flow through one of said axial passages to said face, through said passage means, and thence through the other said axial passage, with consequent heat exchange between said torch head and the fluid.

2. System in accordance with claim 1, wherein:
   said passage means comprises at least one notch in the wall of said inner tube at said one end.

3. An elongate, substantially cylindrical manifold engaging the ends of three fluid conduits, and having a central axis, one end of said conduits being in the form of three concentric tubes disposed on said axis,
   said three concentric tubes comprising a center tube, an inner tube, and an outer tube,
   the interior of said center tube constituting a shielding gas conduit for conveying shielding gas to a torch head;
   the annular region between said inner tube and said center tube constituting a first conduit;
   the annular region between said inner tube and said outer tube constituting a second conduit;
   said manifold having a body with an axial bore disposed on said axis;
   said tubes being concentrically disposed in said axial bore;
   a first longitudinal bore in said body radially spaced from said axial bore;
   a first radial passage between said first conduit and said first longitudinal bore;
   a second longitudinal bore in said body radially spaced from said axial bore;
   a second radial passage between said second conduit and said second longitudinal bore;
   said longitudinal bores being confined within the circumference of the cylindrical manifold;
   said longitudinal bores having connecting means for receiving tubular conduits, longitudinally oriented, for conveying cooling fluid to and from said torch head.

4. Manifold in accordance with claim 3, wherein:
   said axial bore is cylindrical and is stepped with decreasing diameter;
   the outermost first bore portion being of greatest diameter and receiving tightly said outer tube;
   the next inward, second bore portion being of smaller diameter than said first bore portion;
   the next inward, third bore portion being of smaller diameter than said second bore portion and receiving tightly said inner tube.

* * * * *